(12) United States Patent
Choi

(10) Patent No.: US 8,657,330 B1
(45) Date of Patent: Feb. 25, 2014

(54) SIDE AIRBAG

(71) Applicant: Hyundai Motor Company, Seoul (KR)

(72) Inventor: Jae Ho Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/931,054

(22) Filed: Jun. 28, 2013

(30) Foreign Application Priority Data

Nov. 16, 2012 (KR) .................. 10-2012-0129853

(51) Int. Cl.
*B60R 21/16* (2006.01)
(52) U.S. Cl.
USPC ..................................... 280/730.2; 280/736
(58) Field of Classification Search
USPC ............................... 280/730.2, 736
See application file for complete search history.

(56) References Cited

U.S. PATENT DOCUMENTS

| 7,637,530 B2* | 12/2009 | Yamaji et al. | 280/730.2 |
| 8,528,934 B2* | 9/2013 | Kobayshi et al. | 280/740 |
| 2007/0138773 A1* | 6/2007 | Song | 280/729 |

FOREIGN PATENT DOCUMENTS

JP 2012-162136 A 8/2012

* cited by examiner

*Primary Examiner* — Faye M. Fleming
(74) *Attorney, Agent, or Firm* — McDermott Will & Emery LLP

(57) ABSTRACT

A side airbag including: an inflator that ejects gas and is provided at a side of a seat; a cushion that is deployed when receiving the gas from the inflator; a diaphragm that divides the cushion into an upper chamber and a lower chamber by partitioning the inside of the cushion along a first axis; a diffuser that supplies the gas ejected from the inflator to the upper chamber and the lower chamber separately; and a blocking portion which divides the upper chamber into a rear portion and a front portion by partitioning the inside of the cushion along a second axis, the blocking portion includes a plurality of communication portions formed there-through, wherein through each of the plurality of communication portions gas is communicated, and wherein the rear portion receives the gas from the inflator and the front portion receives the gas from the rear portion, whereby the rear portion and the front portion are inflated in sequence in the upper chamber when the cushion is deployed.

14 Claims, 5 Drawing Sheets

SIDE AIRBAG

CROSS-REFERENCE TO RELATED APPLICATION

This application claims under 35 U.S.C. §119(a) the benefit of Korean Patent Application No. 10-2012-0129853 filed on Nov. 16, 2012, the entire contents of which are incorporated herein by reference.

BACKGROUND (a) Technical Field

The present disclosure relates to a side airbag that protects a passenger during a vehicle collision.

(b) Background Art

Generally, various airbags have been installed in a vehicle to protect passengers from a collision. A side airbag in included among these airbags to protect a passenger from a side collision of a vehicle, and is arranged on a side of a seat to protect the passenger from broken glass pieces and the impact of a door which falls in during the side collision.

FIG. 1 is a side view illustrating a side airbag according to a related art. The side airbag includes an inflator I for ejecting gas when a vehicle collides, a cushion 10 for protecting a passenger from the collision, a vent hole 12 on a front of the cushion 10 for discharging gas, and a diaphragm 14 in which holes are formed is provided inside the cushion to partition the inside thereof into an upper part and a lower part.

In the side airbag as described-above, the gas ejected from the inflator I and flowed into the cushion 10 when a vehicle collides first inflates the lower part of the cushion 10 and then moves to the upper part of the cushion 10 through the diaphragm 14 so that a deployment speed of the upper part of the cushion 10 is decreased.

Further, the gas that inflates the lower part of the cushion 10 and then moves to the upper part thereof through the diaphragm 14 is discharged through the vent hole 12, and thus the gas may not be supplied sufficiently to the upper part of the cushion 10 and further may not be circulated fully through the inside of the cushion 10.

As a result, the side airbag may not be deployed fully when a vehicle collides and a deployment speed thereof may be decreased, and thus it can not sufficiently protect a passenger when a vehicle collides.

Furthermore, as a general side airbag is provided on a side of a seat, the deploying cushion 10 is to be in contact with a side of the passenger, and thus the passenger may be injured due to a rapid deployment and high inflation pressure of the cushion 10.

Accordingly, there is a need for an improved side airbag that protects a passenger safely with a rapid and full deployment of an upper part and a lower part of the cushion.

The description provided above as a related art of the present disclosure is just for helping understand the background of the present disclosure, and should not be construed as being included in the related art known by those having ordinary skill in the art.

SUMMARY OF THE DISCLOSURE

The present disclosure has been made in an effort to solve the above-described problems associated with related art, and it is an object of the present disclosure to provide a side airbag capable of improving safety of a passenger by increasing deployment speed of a cushion and deploying the cushion fully.

In order to achieve the object of the present disclosure, the present disclosure provides a side airbag including: an inflator that ejects gas and is provided at a side of a seat; a cushion that is deployed when receiving the gas from the inflator; a diaphragm that divides the cushion into an upper chamber and a lower chamber by partitioning the inside of the cushion along a first axis; a diffuser that supplies the gas ejected from the inflator to the upper chamber and the lower chamber separately; and a blocking portion which divides the upper chamber into a rear portion and a front portion by partitioning the inside of the cushion along a second axis, the blocking portion includes a plurality of communication portions formed there-through, wherein through each of the plurality of communication portions gas is communicated, and wherein the rear portion receives the gas from the inflator and the front portion receives the gas from the rear portion, whereby the rear portion and the front portion are inflated in sequence in the upper chamber when the cushion is deployed.

The blocking portion may be a diaphragm that divides the inside of the upper chamber and each of the plurality of communication portions is a through-hole formed in the blocking portion.

The diaphragm may be formed at a lower part of the cushion such that the upper chamber is disposed at a chest and an abdomen of a passenger and the lower chamber is disposed at a hip of a passenger, and a volume of the upper chamber is larger than that of the lower chamber.

The diaphragm may be configured to shut off a gas flow between the upper chamber and the lower chamber, whereby the lower chamber is deployed more rapidly when the cushion is deployed.

A vent hole through which the gas inside the cushion is discharged may be formed in the upper chamber and is not formed in the lower chamber, wherein the gas in the upper chamber is discharged through the vent hole and the gas in the lower chamber is isolated therein to maintain an inflation state of the lower chamber when the cushion is deployed.

The diffuser may be provided with an upper channel that communicates with the rear portion of the upper chamber and a lower channel that communicates with the lower chamber, based on the diaphragm, wherein the gas ejected from the inflator is supplied simultaneously to the upper chamber and the lower chamber through the upper and lower channels, respectively.

The lower channel of the diffuser may be formed in a hollow shape extending toward the lower chamber and is folded by internal pressure after gas is supplied to the lower chamber so that the gas does not escape.

The blocking portion may be provided at a rear part of the cushion so that a volume of the rear portion is smaller than that of the front portion.

The blocking portion may be inclined to correspond to an upper part of a passenger while the cushion is deployed, and further a width of the blocking portion is narrower than those of the rear portion and the front portion to surround a side of the passenger when the cushion is deployed.

A lower part of the upper chamber may be disposed at a location to match with a door trim and a width of the blocking portion is narrower at a lower part than at an upper part thereof.

A middle part of the upper chamber may be disposed at a location to match with a door trim and a width of the blocking portion is narrower at a middle part than at an upper part or a lower part thereof.

More of the plurality of communication portions formed through the blocking portion are formed at an upper part of the blocking portion than at a lower part thereof.

The first axis may be transverse to the second axis.

The first axis may be horizontal and the second axis may be vertical.

It is understood that the term "vehicle" or "vehicular" or other similar terms as used herein are inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily drawn to scale, and are presenting a somewhat simplified representation of various preferred features illustrative of the basic principles of the disclosure.

In the figures, reference numbers refer to the same or equivalent parts of the present disclosure throughout the several figures of the drawings.

DETAILED DESCRIPTION

Figure 1:
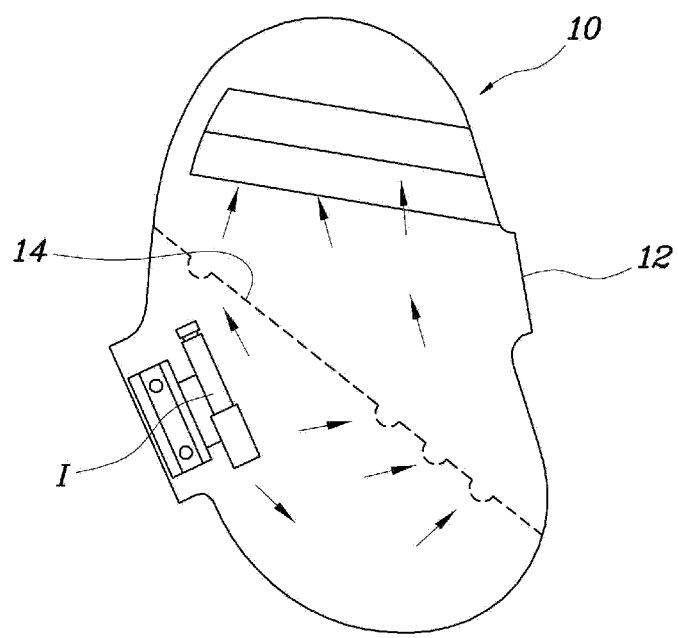
FIG. 1 is a perspective view illustrating a side airbag according to a related art.
Figure 2:
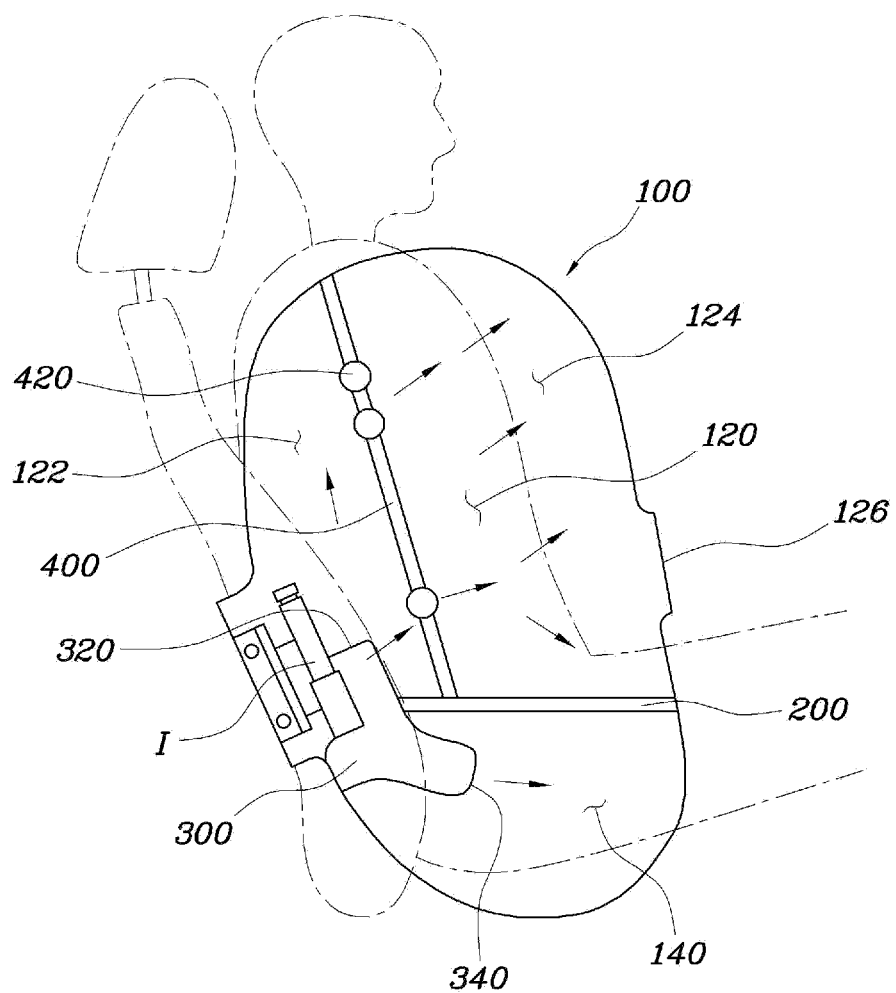
FIG. 2 is a perspective view illustrating a side airbag according to an exemplary embodiment of the present disclosure.

FIG. 2 is a perspective view illustrating a side airbag according to an exemplary embodiment of the present disclosure wherein the side airbag may include: an inflator I that is provided on a side of a seat and ejects gas when a vehicle collides; a cushion 100 that is deployed by receiving gas from the inflator I; a diaphragm 200 that partitions the inside of the cushion 100 into an upper chamber 120 and a lower chamber 140 (the diaphragm 200 can be, for example, oriented horizontally relative to the side airbag); a diffuser 300 that supplies the gas ejected from the inflator I separately into the upper chamber 120 and the lower chamber 140; and a blocking portion 400 which divides the upper chamber 120 into a rear portion 122 and a front portion 124 by partitioning the inside of the upper chamber 120 (e.g., as a vertical partition). The blocking portion 400 includes a plurality of communication portions 420 formed there-through. The gas is communicated through each of the plurality of communication portions 420, wherein the rear portion 122 receives the gas from the inflator I and the front portion 124 receives the gas from the rear portion 122 so that the upper chamber 120 is deployed from the rear portion 122 to the front portion 124 in sequence when the side airbag is deployed.

A cushion of a general side airbag is divided into an upper part and a lower part wherein the gas supplied from the inflator I is first supplied to the lower part and thus the lower part may be inflated prior to the upper part of the cushion 100.

However, the inside of the cushion 100 of the airbag according to the present disclosure is divided into an upper part and a lower part, and further the upper part of the cushion 100 is divided into a front portion 124 and a rear portion 122. In detail, the diaphragm 200 is provided to divide the inside of the cushion 100, e.g., horizontally, into the upper chamber 120 and the lower chamber 140, and further the blocking portion 400 is provided to divide the inside of the upper chamber 120, e.g., vertically as shown in FIG. 2, into the rear portion 122 and the front portion 124.

The blocking portion 400 may have various configurations. For example, the blocking portion 400 may be configured with a plurality of tethers each having a predetermined area and the communication portion(s) 420 may be formed between the respective tethers. In the exemplary embodiment shown in FIG. 4, the blocking portion 400 is a diaphragm-type element that partitions the inside of the upper chamber 120, e.g., vertically, and the communication portion 420 is formed through the blocking portion 400 as a through-hole.

A gas flow between the upper chamber 120 and the lower chamber 140 is restricted by the diaphragm 200. On the other hand, a plurality of communication portions 420 are formed through the blocking portion 400 so that the gas can flow between the rear portion 122 and the front portion 124 of the upper chamber 120. The gas supplied to the lower chamber 140 is isolated therein and thus an inflation speed of the cushion 100 increases to rapidly separate a passenger from a side door. In the upper chamber 120, the gas supplied thereto can also be isolated therein to improve the inflation speed. However, a chest of a passenger where the upper chamber 120 is disposed is weaker than a hip of the passenger where the lower chamber 140 is disposed, and thus the chest may be injured more than the hip with the same impact. Accordingly, a smaller inflation pressure should be applied to the upper chamber 120 relative to the lower chamber 140. As a result, the gas supplied to the upper chamber 120 may flow from the rear portion 122 to the front portion 124 and be discharged. Such a configuration may prevent the passenger from being injured by the cushion 100 that is being inflated, and further the gas supplied to the lower chamber 140 may be isolated therein to increase inflation speed of the lower chamber 140.

A diffuser 300 may be provided such that the gas ejected from the inflator I may be supplied separately into the upper chamber 120 and the lower chamber 140 to deploy them simultaneously. That is, the upper part and lower part of the cushion 100 may be deployed simultaneously to separate the passenger from a side door and at the same time protect a side of the passenger from impact.

As shown in FIG. 2, the diaphragm 200 may be arranged on a lower part of the cushion 100 such that the upper chamber 120 is disposed on a chest and an abdomen of a passenger and the lower chamber 140 is disposed on a hip of the passenger, wherein a volume of the upper chamber 120 is larger than that of the lower chamber 140.

The diaphragm 200 arranged inside the cushion 100 may divide the inside thereof into the upper chamber 120 and the lower chamber 140. The upper chamber 120 is disposed on a chest and an abdomen of a passenger to protect him/her by damping an impact caused from a side collision. The lower chamber 140 is disposed on a hip of the passenger so that the impact is not directly applied to the passenger by allowing the passenger to be separated from a side door when the cushion is deployed. A volume of the lower chamber 140 may be smaller than that of the upper chamber 120 and thus the lower chamber 140 can be inflated rapidly by the gas supplied thereto. Such a configuration can make it possible for a passenger to avoid direct impact of a collision by separating him/her firstly from a side door, and further, the cushion 100 can be deployed promptly without interference from the passenger.

The diaphragm 200 may be configured to shut off gas flow between the upper chamber 120 and the lower chamber 140 so that the lower chamber 140 can be deployed fully when the cushion is deployed.

Generally, a side airbag is designed such that a lower part of the cushion 100 is deployed firstly and fully when a vehicle collides so as to separate a passenger from a door and to prevent applying a direct impact to him/her. Further, an upper part of the side airbag damps the impact to protect the passenger. To this end, the inside of the cushion 100 according to the present disclosure may be divided into the upper chamber 120 and the lower chamber 140 and gas flow is shut off therebetween, and the gas may be supplied simultaneously to the upper chamber 120 and the lower chamber 140 to deploy the lower chamber 140 of the cushion 100 rapidly and fully. That is, the gas supplied to the lower chamber 140 may be isolated therein and may not flow to an outside of the lower chamber 140 or the upper chamber 120, and thus the lower chamber 140 may be filled promptly with the gas to increase the full-deployment speed thereof. When there is no space in the fully deployed lower chamber 140, the gas supplied from the inflator I may flow to the upper chamber 120 to improve a deployment speed of the whole cushion 100.

In more detail, the vent hole 126 through which gas in the cushion 100 is discharged may be formed on the upper chamber 120 and does not need to be formed in the lower chamber 140. Accordingly, the gas in the upper chamber 120 may be discharged through the vent hole 126 when the cushion is deployed, and the gas in the lower chamber 140 may be isolated therein to maintain an inflation state of the lower chamber 140.

That is, the gas may be supplied simultaneously to the upper chamber 120 and the lower chamber 140 from the inflator I to deploy simultaneously an upper part and a lower part of the cushion 100; wherein the gas in the upper chamber 120 may be discharged through the vent hole 126 after damping the impact applied to a passenger, and the gas in the lower chamber 140 may be isolated therein since there is no discharging channel such as the vent hole 126 in the lower chamber 140. As a result, the gas which flowed into the lower chamber 140 may be isolated therein to maintain a deployment state after being deployed, thereby reducing impact caused from a collision and protecting the passenger from being injured due to falling-in of a door.

Figure 3:
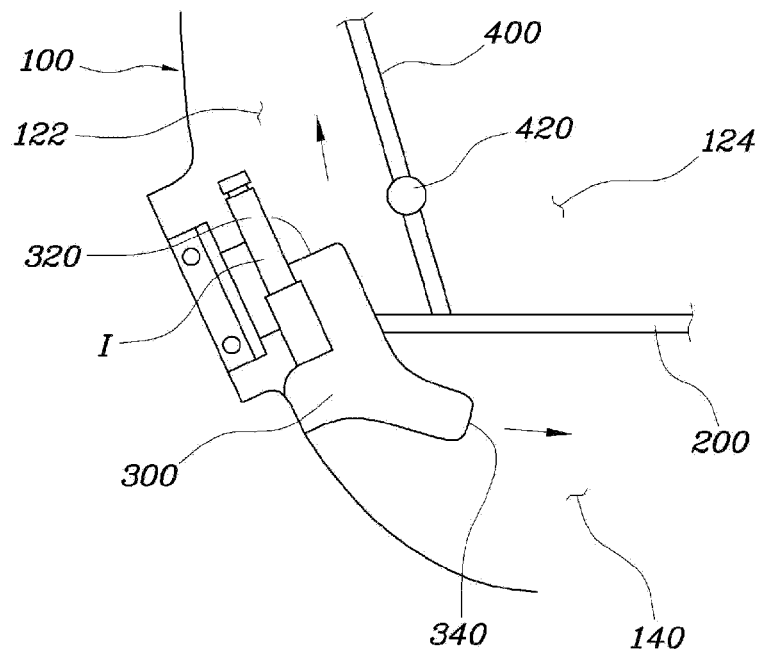
FIG. 3 is a perspective view illustrating a diffuser of the side airbag shown in FIG. 2.

As shown in FIG. 3, the diffuser 300 may be provided with an upper channel 320 that communicates with the rear portion 122 of the upper chamber 120 and a lower channel 340 that communicates with the lower chamber 140 based on the diaphragm 200, such that the gas from the inflator I is supplied simultaneously to the upper chamber 120 and the lower chamber 140.

In the side airbag according to the present disclosure, the gas supplied from the inflator I may be supplied simultaneously to the upper chamber 120 and the lower chamber 140 to improve a deployment thereof. To this end, the diffuser 300 coupled to the inflator I may be provided in the cushion 100 wherein the diffuser 300 may be provided with the upper channel 320 and the lower channel 340 to supply the gas from the inflator I to all of an upper part and a lower part of the cushion 100. As a result, the upper chamber 120 and the lower chamber 140 of the cushion 100 may be deployed simultaneously to improve a deployment speed of the whole cushion 100.

Figure 4:
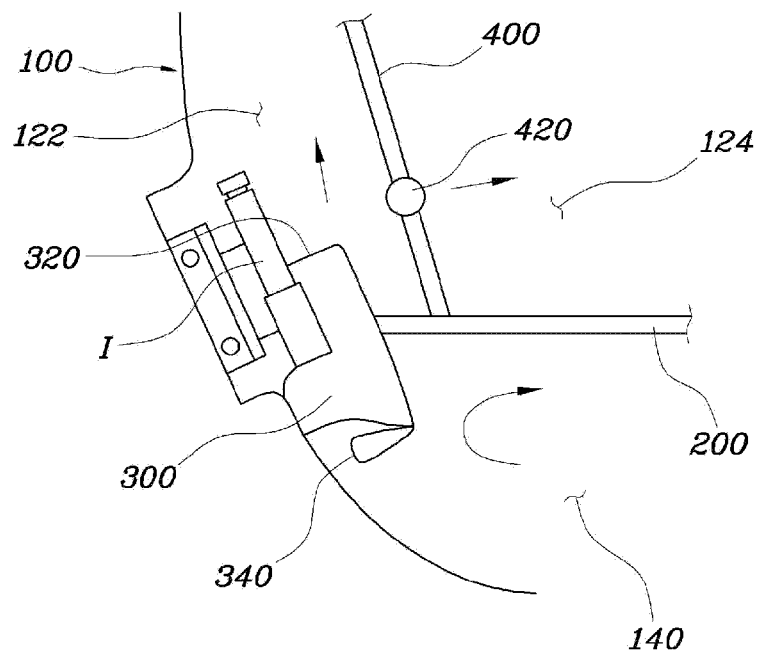
FIG. 4 is a perspective view illustrating a folded lower channel of the diffuser of the side airbag shown in FIG. 2.

FIG. 4 is a view illustrating a folded lower channel 340 of the diffuser 300 of the side airbag shown in FIG. 2 wherein the lower channel 340 of the diffuser 300 may be formed in a hollow shape extending toward the lower chamber 140, and may be designed to form a hole in a cloth that has a spare area and extends toward the lower chamber 140. In detail, as shown in FIG. 4, the lower channel 340 may be formed in a hollow circular shape that extends toward the lower chamber 140 such that the lower channel 340 may be folded by internal pressure after gas is supplied to the lower chamber 140 so that the gas does not escape.

The lower channel 340 may be configured such that the gas flowed into the lower chamber 140 may be isolated therein not to escape outside so as to maintain an inflation state of the lower chamber 140. That is, the gas ejected from the inflator I may be supplied to the upper chamber 120 and the lower chamber 140 through the diffuser 300 wherein the gas supplied to the upper chamber 120 inflates the upper chamber 120, while the gas flows from the rear portion 122 to the front portion 124 and then is discharged.

However, according to an exemplary embodiment, since there is no discharging means in the lower chamber 140, the gas supplied to the lower chamber 140 may flow again through the lower channel 340 of the diffuser 300 in order to inflate the lower chamber 140 and be discharged, but the lower channel 340 extending toward the lower chamber 140 of the diffuser 300 may be folded by the pressure of the flowing gas to block the channel 340 through which the gas is discharged. As a result, the gas flowed into the lower chamber 140 may be isolated therein to maintain an inflation state of the cushion 100 to separate a passenger from a door, thereby reducing impact caused from a falling-in of the door.

The blocking portion 400 may be provided on a rear part of the cushion 100 such that a volume of the rear portion 122 is smaller than that of the front portion 124.

In detail, generally, gas in a smaller volume has greater pressure in an inverse proportional relation. The volume of the rear portion 122 which receives the gas ejected from the inflator I may become smaller with the blocking portion 400 provided on a rear part of the cushion 100 so that an inflation speed of the upper chamber 120 can be increased and sufficient pressure can be generated to tear a seat and deploy the cushion.

Figure 5:
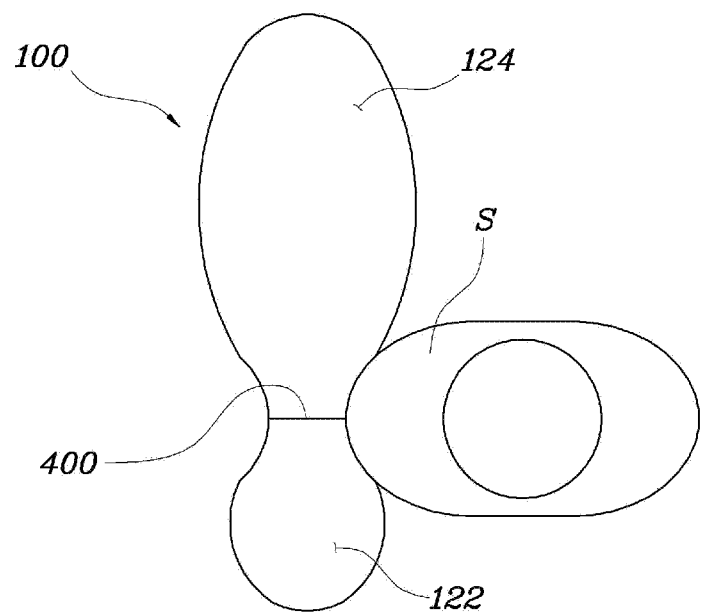
FIG. 5 is a view illustrating a side of a passenger surrounded by the side airbag shown in FIG. 2.

As shown in FIG. 2, the blocking portion 400 may be inclined corresponding to an upper part of a passenger while the cushion 100 is deployed, and as shown in FIG. 5, a width of the blocking portion 400 may be narrower than widths of the rear portion 122 and the front portion 124 to surround a side of a passenger S when the cushion 100 is deployed.

A general side airbag may be formed in a circular shape or an oval shape extending forwardly when the cushion 100 is deployed so that the side airbag may injure a chest of a passenger S when deployed. In order to solve this problem, according to an exemplary embodiment of the side airbag of the present disclosure, the width of the blocking portion 400 may be formed as a concave shape in which the width is narrower than the widths of the rear portion 122 and the front portion 124 to surround the chest of the passenger S. In such a configuration, the deployed cushion 100 may surround the chest of the passenger S to minimize the injury that may be caused while a vehicle collides.

Further, the blocking portion 400 may be formed to be inclined corresponding to an upper part of the passenger while the cushion 100 is deployed to improve safety for the passenger by not directly applying excessive inflation pressure to the passenger generated in accordance with a deployment of the cushion 100.

Figure 6:
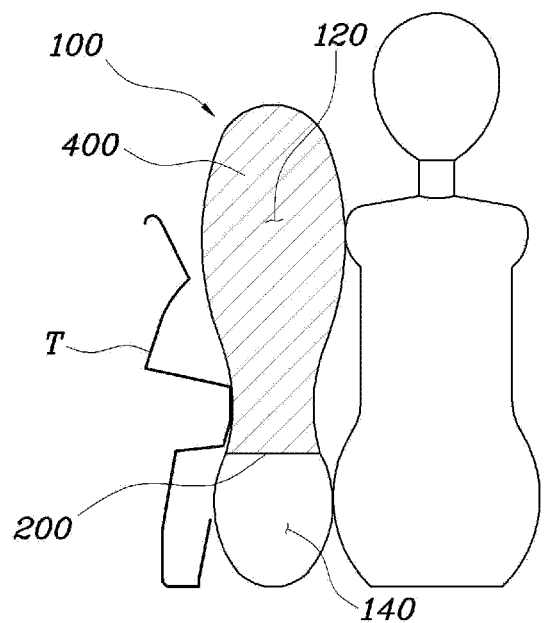
FIGS. 6 and 7 are views of cushion shapes in accordance with a blocking portion of the side airbag shown in FIG. 2.
Figure 7:
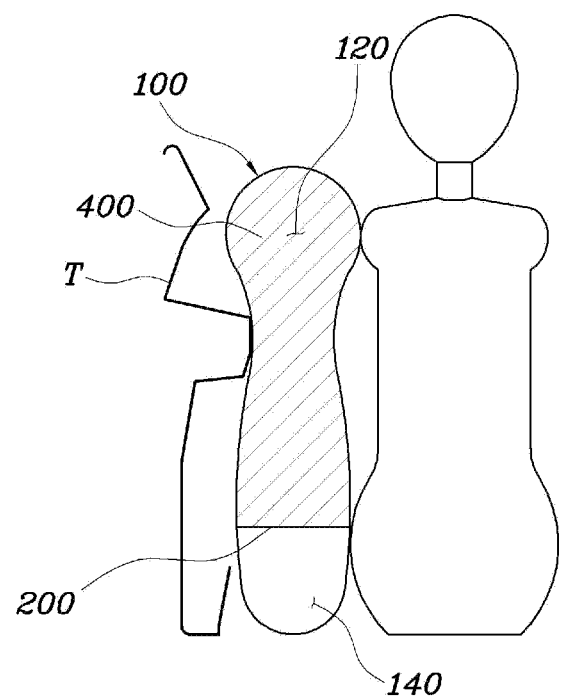

As shown in FIGS. 6 and 7, a lower part of the upper chamber 120 may be disposed at a location to match with a door trim, and the width of the blocking portion 400 may be narrower at its lower part than at its upper part.

Further, a middle of the upper chamber 120 may be disposed at a location to match with the door trim, and the width of the blocking portion 400 at its middle part may be narrower than those at its upper and lower parts.

The door trim T for a vehicle may be disposed variously in accordance with an indoor configuration and design of the vehicle. The door trim T may protrude toward a driver from a door to interfere with the deployment of the cushion 100.

In order to solve the above problem, the width of the blocking portion 400 may be adjusted in accordance with the locations of the door trim T to adjust the shape of the upper chamber 120. For example, when the door trim T is disposed at a lower part of the upper chamber 120 of the cushion 100, the width of the blocking portion 400 may be narrower than an upper part of the upper chamber 120, and when the door trim T is disposed at a middle part of the upper chamber 120, the width of the blocking portion 400 may be narrower than those of an upper part and a lower part of the upper chamber 120. In such a configuration, the width of the blocking portion 400 may be adjusted variously in accordance with the locations of the door trim T that is arranged variously in a vehicle to prevent interference of the cushion deployment by a passenger and the door trim T, and thus improve the cushion deployment.

More of the plurality of communication portions 420 formed through the blocking portion 400 may be arranged at an upper side than at a lower side thereof.

That is, the gas supplied to the rear portion 122 of the upper chamber 120 may not flow directly to the front portion 124 through the communication portion(s) 420 but may circulate sufficiently even through an upper part of the rear portion 122 to deploy the cushion 100 fully.

Here, a width of the communication portion(s) 420 at an upper side of the blocking portion 400 may be larger than that at a lower side of the communication portion(s) 420 to supply the gas sufficiently to the upper part of the cushion 100.

More of the plurality of communication portions 420 formed through the blocking portion 400 may be provided at an upper side than at a lower side of the blocking portion 400 so that the gas supplied to the rear portion 122 flows to the front portion 124 through the communication portions 420, wherein the gas can circulate sufficiently even through an upper part of the rear portion 122 to deploy the cushion fully.

While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

What is claimed is:

1. A side airbag comprising:
   an inflator that ejects gas and is provided at a side of a seat;
   a cushion that is deployed when receiving the gas from the inflator;
   a diaphragm that divides the cushion into an upper chamber and a lower chamber by partitioning the inside of the cushion along a first axis;
   a foldable diffuser that supplies the gas ejected from the inflator to the upper chamber and the lower chamber separately; and
   a blocking portion which divides the upper chamber into a rear portion and a front portion by partitioning the inside of the cushion along a second axis, the blocking portion includes a plurality of communication portions formed there-through,
   wherein through each of the plurality of communication portions gas is communicated, and
   wherein the rear portion receives the gas from the inflator and the front portion receives the gas from the rear portion, whereby the rear portion and the front portion are inflated in sequence in the upper chamber when the cushion is deployed.

2. The side airbag according to claim 1, wherein the blocking portion is a diaphragm that divides the inside of the upper chamber and each of the plurality of communication portions is a through-hole formed in the blocking portion.

3. The side airbag according to claim 1, wherein the diaphragm is formed at a lower part of the cushion such that the upper chamber is disposed at a chest and an abdomen of a passenger and the lower chamber is disposed at a hip of a passenger, and a volume of the upper chamber is larger than that of the lower chamber.

4. The side airbag according to claim 1, wherein the diaphragm is configured to shut off a gas flow between the upper chamber and the lower chamber, whereby the lower chamber is deployed more rapidly when the cushion is deployed.

5. The side airbag according to claim 1, wherein a vent hole through which the gas inside the cushion is discharged is formed in the upper chamber and is not formed in the lower chamber, wherein the gas in the upper chamber is discharged through the vent hole and the gas in the lower chamber is isolated therein to maintain an inflation state of the lower chamber when the cushion is deployed.

6. The side airbag according to claim 1, wherein the diffuser is provided with an upper channel that communicates with the rear portion of the upper chamber and a lower channel that communicates with the lower chamber, based on the diaphragm, wherein the gas ejected from the inflator is supplied simultaneously to the upper chamber and the lower chamber through the upper and lower channels, respectively.

7. The side airbag according to claim 6, wherein the lower channel of the diffuser is formed in a hollow shape extending toward the lower chamber and is folded by internal pressure after gas is supplied to the lower chamber so that the gas does not escape.

8. The side airbag according to claim 1, wherein the blocking portion is provided at a rear part of the cushion such that a volume of the rear portion is smaller than that of the front portion.

9. The side airbag according to claim 1, wherein the blocking portion is inclined to correspond to an upper part of a passenger while the cushion is deployed, and further a width of the blocking portion is narrower than those of the rear portion and the front portion to surround a side of the passenger when the cushion is deployed.

10. The side airbag according to claim 1, wherein a lower part of the upper chamber is disposed at a location to match with a door trim and a width of the blocking portion is narrower at a lower part than at an upper part thereof.

11. The side airbag according to claim 1, wherein a middle part of the upper chamber is disposed at a location to match with a door trim and a width of the blocking portion is narrower at a middle part than at an upper part or a lower part thereof.

12. The side airbag according to claim 1, wherein more of the plurality of communication portions formed through the blocking portion are formed at an upper part of the blocking portion than at a lower part thereof.

13. The side airbag according to claim 1, wherein the first axis is transverse to the second axis.

14. The side airbag according to claim 1, wherein the first axis is horizontal and the second axis is vertical.

* * * * *